(12) United States Patent
Chen et al.

(10) Patent No.: US 10,313,247 B2
(45) Date of Patent: Jun. 4, 2019

(54) SYSTEM, METHOD, AND DEVICE FOR NETWORK LOAD BALANCE PROCESSING

(71) Applicant: WANGSU SCIENCE & TECHNOLOGY CO., LTD., Shanghai (CN)

(72) Inventors: Xionglin Chen, Shanghai (CN); Wensheng Chen, Shanghai (CN); Li Chen, Shanghai (CN); Wenjuan Chen, Shanghai (CN); Binbin Zheng, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 1 day.

(21) Appl. No.: 15/556,363

(22) PCT Filed: Sep. 4, 2016

(86) PCT No.: PCT/CN2016/097988
§ 371 (c)(1),
(2) Date: Sep. 7, 2017

(87) PCT Pub. No.: WO2017/050117
PCT Pub. Date: Mar. 30, 2017

(65) Prior Publication Data
US 2018/0109456 A1    Apr. 19, 2018

(30) Foreign Application Priority Data
Sep. 25, 2015    (CN) .......................... 2015 1 0623156

(51) Int. Cl.
*H04L 29/06*    (2006.01)
*H04L 29/08*    (2006.01)
(Continued)

(52) U.S. Cl.
CPC ........ *H04L 47/125* (2013.01); *H04L 63/1441* (2013.01); *H04L 63/1458* (2013.01);
(Continued)

(58) Field of Classification Search
CPC ............... H04L 47/193; H04L 63/1441; H04L 63/1458
(Continued)

(56) References Cited

U.S. PATENT DOCUMENTS 6,519,051 B1 *    2/2003    Wu ..................... H04N 1/00281
358/1.15
7,613,193 B2 *    11/2009    Swami .................. H04W 12/12
370/349
(Continued)

FOREIGN PATENT DOCUMENTS

CN    102523302 A    6/2012
CN    103533080 A    1/2014
(Continued)

OTHER PUBLICATIONS

"Middleboxes and Tunneling"—Mike Freedman, Princeton University, Apr. 2011 http://www.cs.princeton.edu/courses/archive/spr11/cos461/docs/lec11-middleboxes.pdf (Year: 2011).*
(Continued)

*Primary Examiner* — Randy A Scott
(74) *Attorney, Agent, or Firm* — Anova Law Group, PLLC

(57) ABSTRACT

A system, a method, and a device for network load balance processing are provided. The network load balance processing method includes: establishing, by a virtual server, connection with a client; sending, by the virtual server, a control command to a back-end server and information related to connection to the back-end server, such that the back-end server starts a connection service based on the control command directed to connection; forwarding, by the virtual
(Continued)

server, a data request packet from the client, where the back-end server is configured to respond to the data request packet based on the connection service and send response information to the client. Through the present disclosure, the issue of high memory consumption in the network load balance processing is solved, thereby achieving an effect of low memory consumption in the network load balance processing.

12 Claims, 8 Drawing Sheets

(51) Int. Cl.
*H04L 12/803* (2013.01)
*H04L 12/801* (2013.01)

(52) U.S. Cl.
CPC ........ *H04L 63/164* (2013.01); *H04L 67/1027* (2013.01); *H04L 47/193* (2013.01); *H04L 67/42* (2013.01); *H04L 69/163* (2013.01)

(58) Field of Classification Search
USPC ........ 370/249, 252, 389; 709/227, 228, 231, 709/246
See application file for complete search history.

(56) References Cited

U.S. PATENT DOCUMENTS

| | | | |
|---|---|---|---|
| 10,104,166 B2* | 10/2018 | Chauhan | H04L 67/1002 |
| 2006/0230129 A1 | 10/2006 | Swami et al. | |
| 2009/0271521 A1* | 10/2009 | Brabson | H04L 47/10 709/228 |

FOREIGN PATENT DOCUMENTS

| | | |
|---|---|---|
| CN | 103973584 A | 8/2014 |
| CN | 105162883 A | 12/2015 |

OTHER PUBLICATIONS

The World Intellectual Property Organization (WIPO) International Search Report for PCT/CN2016/097988 dated Nov. 30, 2016 5 Pages.
The European Patent Office (EPO) The Extended European Search Report for 16847999.6 dated Jul. 12, 2018 7 Pages.

* cited by examiner

| 04:35:00 PM | CPU | %user | %nice | %sys | %iowait | %irq | %soft | %steal | %idle | intr/s |
|---|---|---|---|---|---|---|---|---|---|---|
| 04:35:02 PM | all | 1.02 | 0.00 | 3.10 | 1.49 | 0.00 | 15.38 | 0.00 | 79.01 | 143457.29 |
| 04:35:02 PM | 0 | 0.00 | 0.00 | 3.12 | 6.25 | 0.00 | 79.17 | 0.00 | 11.46 | 0.00 |
| 04:35:02 PM | 1 | 1.09 | 0.00 | 1.09 | 0.00 | 0.00 | 78.26 | 0.00 | 19.57 | 4473924264.58 |
| 04:35:02 PM | 2 | 1.10 | 0.00 | 3.30 | 0.00 | 0.00 | 80.22 | 0.00 | 15.38 | 4473924262.50 |
| 04:35:02 PM | 3 | 0.00 | 0.00 | 0.00 | 3.23 | 0.00 | 67.74 | 0.00 | 29.03 | 4473924264.58 |
| 04:35:02 PM | 4 | 0.00 | 0.00 | 0.00 | 0.00 | 0.00 | 46.15 | 0.00 | 53.85 | 5.21 |
| 04:35:02 PM | 5 | 2.78 | 0.00 | 0.00 | 0.00 | 0.00 | 33.33 | 0.00 | 63.89 | 0.00 |
| 04:35:02 PM | 6 | 1.05 | 0.00 | 3.16 | 0.00 | 0.00 | 71.58 | 0.00 | 24.21 | 5.21 |
| 04:35:02 PM | 7 | 0.00 | 0.00 | 1.59 | 0.00 | 0.00 | 65.08 | 0.00 | 33.33 | 4473924264.58 |
| 04:35:02 PM | 8 | 1.45 | 0.00 | 4.35 | 0.00 | 0.00 | 43.48 | 0.00 | 50.72 | 4473924264.58 |
| 04:35:02 PM | 9 | 1.67 | 0.00 | 1.67 | 0.00 | 0.00 | 36.67 | 0.00 | 60.00 | 4473924262.50 |
| 04:35:02 PM | 10 | 1.52 | 0.00 | 6.06 | 0.00 | 0.00 | 33.33 | 0.00 | 59.09 | 9.38 |
| 04:35:02 PM | 11 | 1.61 | 0.00 | 3.23 | 0.00 | 0.00 | 32.26 | 0.00 | 62.90 | 3.12 |
| 04:35:02 PM | 12 | 1.01 | 0.00 | 1.51 | 19.60 | 0.00 | 0.00 | 0.00 | 77.89 | 4473924264.58 |
| 04:35:02 PM | 13 | 1.01 | 0.00 | 4.03 | 0.00 | 0.00 | 0.00 | 0.00 | 94.97 | 0.00 |

FIG. 13

SYSTEM, METHOD, AND DEVICE FOR NETWORK LOAD BALANCE PROCESSING

CROSS-REFERENCES TO RELATED APPLICATIONS

This application is a national phase entry under 35 U.S.C. § 371 of International Application No. PCT/CN2016/097988, filed on Sep. 4, 2016, which claims priority of Chinese Patent Application No. 201510623156.X, filed with the State Intellectual Property Office of P. R. China on Sep. 25, 2015, the entire contents of all of which are incorporated herein by reference.

FIELD OF THE DISCLOSURE

The present disclosure relates to the field of communication and, more particularly, relates to a network load balance processing system, and a method and device thereof.

BACKGROUND

A virtual server often refers to a virtual server-clustering system, such as a Linux virtual server (LVS). Such virtual server may provide a virtual interne protocol (VIP) between virtual networks for user access. The access request first passes through the VIP of the virtual server to arrive at the load balancer. Later, the load balancer selects one service node from the back-end server list for carrying out response.

FIG. 1 illustrates a flow chart of an existing network load balance processing method. As shown in FIG. 1, the connection of the virtual server may be established in a direct routing (DR) mode, a tunnel mode, or a network address translation (NAT) mode. The client may issue a transmission control protocol (TCP) connection request with the target IP being the VIP. When the Linux external preset command SEQ is equal to 1, first, the client sends a transmission control protocol (TCP) handshake signal (i.e., a synchronous packet, hereinafter referred to as "SYN packet") to the virtual server. Further, the virtual server forwards the SYN packet to the back-end server, and after receiving the SYN packet, the back-end server sends an acknowledgement signal (i.e., a synchronous acknowledgement packet, hereinafter referred to as "SYN ACK packet") to the client. As indicated by the dashed lines and solid lines shown in FIG. 1, whether the SYN ACK packet passes through the virtual server when being sent to the client differs slightly in different modes. When the client receives the SYN ACK packet, a response signal (i.e., an acknowledgement packet, hereinafter referred to as "ACK packet") is sent to the virtual server, and the visual sever forwards the received ACK packet to the back-end server. Accordingly, the TCP request connection of the user is actually a connection established with the back-end server, and the virtual server only functions to forward the data packet.

In such a manner, when the server suffers from denial of service type attack (e.g., SYN Flood), the virtual server needs to establish a connection record for each SYN packet and forward the SYN packet to the back-end server at the back end. When the volume of the attack traffic is very large, the virtual server needs to establish a large amount of connection records, which consume memory resources and result in the memory to be easily consumed up, thereby causing the system to crash because of a too heavy load and leading to a consequence of service interruption.

Directed to the issue of high memory consumption in the network load balance processing in related techniques, no effective resolution has been put forwards yet.

BRIEF SUMMARY OF THE DISCLOSURE

The primary object of the present disclosure is to provide a network load balance processing system, and a method and device thereof, thereby solving the issue of high consumption memory in network load balance processing.

To implement the aforementioned object, according to one aspect of the present disclosure, a network load balance processing method is provided. The method includes: establishing, by a virtual server, a connection with a client; sending, by the virtual server, a control command to a back-end server and information related to connection to the back-end server, such that the back-end server starts a connection service based on the control command directed to connection; forwarding, by the virtual server, a data request packet from the client, where the back-end server is configured to respond to the data request packet based on the connection service and send response information to the client.

To implement the aforementioned object, according to another aspect of the present disclosure, a network load balance processing method is provided. The method includes: receiving, by a back-end server, a control command from a virtual server, where the virtual server is configured to send the control command to the back-end server after being connected to a client and send information related to connection to the back-end server; starting, by the back-end server, a connection service based on the control command directed to connection; receiving, by the back-end server, a data request packet forwarded by the virtual server from the client; and responding, by the back-end server, to the data request packet based on the connection service, and sending, by the back-end server, response information to the client.

Further, the control command is sent in a form of data packet, and after the back-end server receives the data packet, the network load balance processing method further includes:

determining, by the back-end server, whether the data packet is a data packet forwarded by the virtual server; if the back-end server determines that the data packet is not the data packet forwarded by the virtual server, no processing is executed by the back-end server towards the data packet; and if the back-end server determines that the data packet is the data packet forwarded by the virtual server, parsing is executed by the back-end server on the data packet, such that the control command is parsed out from the data packet.

Further, the back-end server determines whether the data packet is forwarded by the virtual server via the following method: determining, by the back-end server, whether the data packet is a data packet carries a preset authorization identifier; if the back-end server determines that the data packet is a data packet carries the preset authorization identifier, the back-end server confirms that the data packet is the data packet forwarded by the virtual server; and if the back-end server determines that the data packet is a data packet carries no preset authorization identifier, the back-end server confirms that the data packet is not the data packet forwarded by the virtual server.

Further, starting, by the back-end server, the connection service based on the control command directed to connection includes: parsing out, by the back-end server, address information of the client and port information of the client from the control command; and starting, by the back-end server, the connection service for the client based on the address information of the client and the port information of the client.

To implement aforementioned object, according to another aspect of the present disclosure, a network load balance processing device is provided. The device comprises: a connecting unit, configured to allow a virtual server to establish connection with a client; a sending unit, configured to send a control command to a back-end service and send information related to connection to the back-end server, such that the back-end server starts a connection service based on the control command directed to connection; and a forwarding unit, configured to forward a data request packet from the client to the back-end server, where the back-end server is configured to respond to the data request packet based on the connection service and send response information to the client.

To achieve the aforementioned object, according to another aspect of the present disclosure, a network load balance processing device is provided, including; a first receiving unit, configured to receive a control command from a virtual server, where the virtual server is configured to, after establishing connection with a client, send the control command to a back-end server and send information related to connection to the back-end server; a starting unit, configured to start a connection service based on the control command directed to connection; a second receiving unit, configured to receive a data request packet forwarded by the virtual server from the client; and a responding unit, configured to respond to the data request packet based on the connection service and send the response information to the client.

Further, the network load balance processing device further includes: a determining unit configured to, after receiving the data packet, determine whether the data packet is the data packet forwarded by the virtual server, where the control command is sent in a form of data packet; a parse-processing unit configured to, when the back-end server determines that the data packet is not the data packet forwarded by the virtual server, execute no processing on the data packet, and when the back-end server determines that the data packet is the data packet forwarded by the virtual server, execute parsing on the data packet and parse out the control command from the data packet.

Further, the determining unit is configured to determine whether the data packet is the data packet forwarded by the virtual server by determining whether the data packet is a data packet carries a preset authorization identifier. In particular, if the back-end server determines that the data packet is the data packet carries the preset authorization identifier, the back-end server determines that the data packet is the data packet forwarded by the virtual server. If the back-end server determines that the data packet is the data packet carries no preset authorization identifier, the back-end server determines that the data packet is not the data packet forwarded by the virtual server.

To achieve the aforementioned object, according to another aspect of the present disclosure, a network load balance processing system is provided. The system includes: a client, a virtual server, and a back-end server. In particular, the virtual server is configured to establish connection with a client, send a control command to the back-end server, send information related to connection to the back-end server, and forward a data request packet from the client to the back-end server; the back-end server is configured to start a connection service based on the control command directed to connection, receive the data request packet forwarded by the virtual server, respond to the data request packet based on the connection service, and send response information to the client.

Through the present disclosure, a virtual server is applied to establish connection with a client; the virtual server sends a control command to a back-end server and sends information related to connection to the back-end server, such that the back-end server starts a connection service based on the control command directed to connection; and the virtual server forwards a data request packet from the client to the back-end server. In particular, the back-end server is configured to respond to the data request packet based on the connection service.

Accordingly, the issue of high memory consumption in the network load balance processing is solved, thereby achieving an effect of low memory consumption in the network load balance processing.

BRIEF DESCRIPTION OF THE DRAWINGS

The accompanying drawings forming a part of the present disclosure are intended to provide further understanding of the present disclosure. The illustrative embodiments of the present disclosure and descriptions thereof are intended to explain the present disclosure and do not constitute inappropriate limitation of the present disclosure. In the accompanying drawings:

FIG. 13 illustrates a schematic view of a situation of memory occupancy rate according to embodiments of the present disclosure.

DETAILED DESCRIPTION

It should be noted that the embodiments of the present disclosure and the features of the embodiments may be combined with each other if there is no conflict. The present disclosure will be illustrated in detail hereinafter with reference to accompanying drawings in conjunction with embodiments.

To make those skilled in the relevant art better understand solutions of the present disclosure, technical solutions in embodiments of the present disclosure will be described in a clear and complete manner hereinafter with reference to accompanying drawings in embodiments of the present disclosure. Obviously, embodiments described herein are only a part of embodiments of the present disclosure, but not entire embodiments. Based on embodiments of the disclosed present disclosure, all other embodiments obtainable by those ordinarily skilled in the art without creative labor shall fall within the protection scope of the present disclosure.

It should be noted that, terms such as "first" and "second" in the specification and claim, as well as the aforementioned accompanying drawings of the present disclosure are used to differentiate similar objects, but are not necessarily configured to describe particular order or sequential order. It should be understood that data so used may be interchanged under appropriate situations such that embodiments of the present disclosure can be conveniently described. Further, terms of "including" and "comprising", or any other variation thereof are intended to cover a non-exclusive inclusion. For example, a process, method, system, article or apparatus that comprises a list of steps or units may not be limited to the steps or units clearly listed, but may include other steps or units not expressly listed or inherent to such process, method, article or apparatus.

Figure 1:
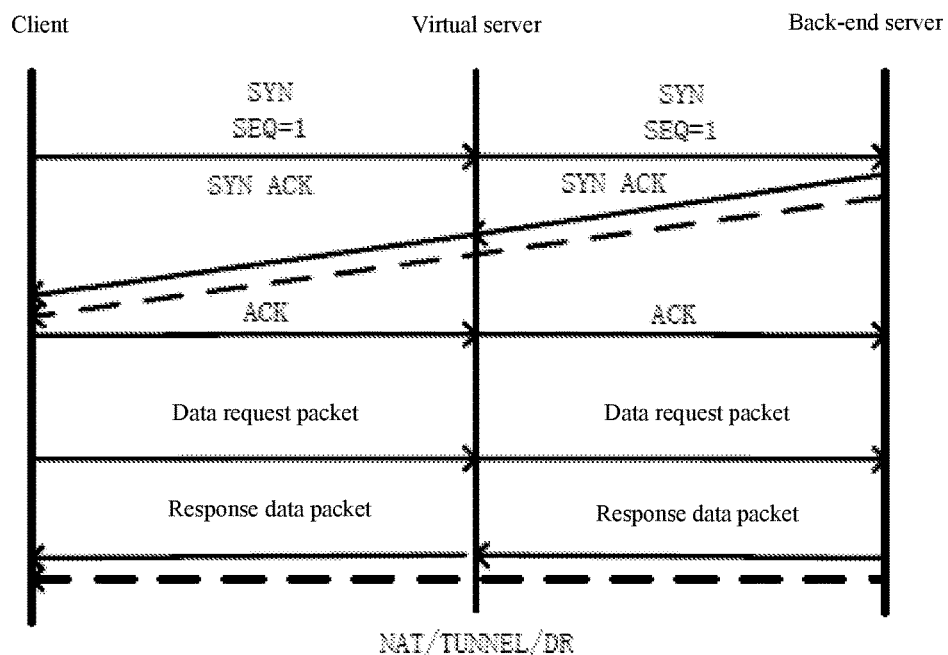
FIG. 1 illustrates a flow chart of an existing network load balance processing method.
Figure 2:
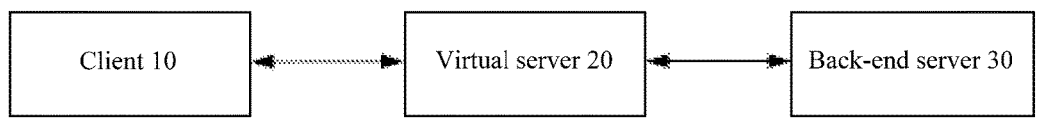
FIG. 2 illustrates a schematic view of a network load balance processing system according to embodiments of the present disclosure.

Embodiments of the present disclosure provide a network load balance processing system. FIG. 2 illustrates a schematic view of a network load balance processing system according to embodiments of the present disclosure.

As shown in FIG. 2, the disclosed network load balance processing system includes a client 10, a virtual server 20, and a back-end server 30.

The client 10 is configured to send a handshake signal (i.e., a SYN packet), a response signal (i.e., an ACK packet), and a data request packet of a TCP connection request to the virtual server 20, and receive an acknowledgement signal (i.e., a SYN ACK packet) sent by the virtual server 20. The client 10 may be an ordinary internet user, or a special customer in a specialized field.

The virtual server 20 is configured to establish connection with the client 10, receive the SYN packet sent by the client 10, and send the SYN ACK packet to the client. Preferably, the virtual server is a Linux virtual server LVS. After the virtual server 20 establishes connection with the client 10, the virtual server 20 sends a control command to the back-end server 30 and send information related to connection to the back-end server 30. In particular, the back-end server 30 is a real server responsive to the TCP request connection, and the information related to connection includes key information such as an IP address and a port of the client 10. The virtual server 20 is further configured to forward a data request packet from the client 10 to the back-end server 30.

The back-end server 30 is configured to, based on the received control command sent by the virtual server 20, start a connection service directed to connection established between the client 10 and the visual client 20. After the connection service is started, the back-end server 30 is further configured to receive the data request packet forwarded by the virtual server 20 and respond to the data request packet based on the started connection service.

Figure 3:
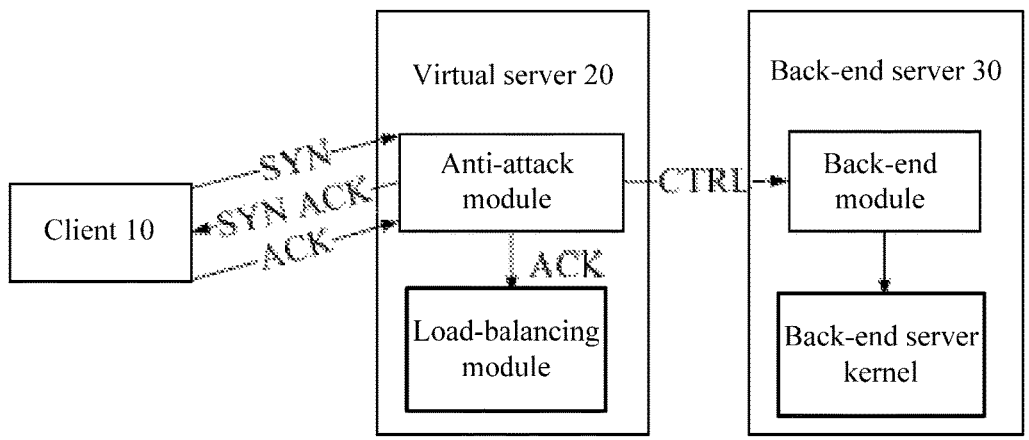
FIG. 3 illustrates a structural schematic view of a network load balance processing system according to embodiments of the present disclosure.

FIG. 3 illustrates a structural schematic view of a network load balance processing system according to embodiments of the present disclosure. As shown in FIG. 3, the disclosed network load balance processing system includes a client 10, a virtual server 20, and a back-end server 30. In particular, the virtual server 20 is described using a Linux virtual server (i.e., an LVS server) as an example. The virtual server 20 includes an anti-attack module and a load-balancing module, and the back-end server 30 includes a back-end module and a back-end server kernel. For the client 10 to establish TCP connection with the LVS server, the client 10 first issues a TCP connection request to the LVS server, where the TCP request is a request with a target IP being the VIP. The client 10 sends the SYN packet to the anti-attack module of the LVS server, and the anti-attack module of the LVS server receives the SYN packet sent by the client 10. Preferably, the anti-attack module of the LVS server carries the data of SYN cookies stored in a local user terminal. Such anti-attack module is primarily responsible for acknowledging the SYN packet sent by the client 10 and replying the SYN ACK packet to the client 10, instead of directly sending the SYN ACK packet to the back-end server 30. After the client 10 responds to the SYN ACK packet, the anti-attack module of the LVS server receives the ACK packet replied by the client 10.

The connection of the disclosed virtual server uses a DR mode, and the anti-attack module of the LVS server refers to the spirit of the SYN Cookies in the Linux TCP stack. More specifically, in the DR mode, the LVS server constructs a SYN ACK packet with a special preset external command SEQ to the client 10, and validates whether an authorization identifier ACK_SEQ in the ACK packet sent by the client 10 is legitimate or not. If the authorization identifier ACK_SEQ in the ACK packet received by the anti-attack module of the LVS server is legitimate, the LVS server allocates memory for the SYN packet. If the authorization identifier ACK_SEQ is illegitimate, the LVS server allocates no memory. Such anti-attack module with a SYN Cookies function, under situations of a large volume of attack traffic, prevents the LVS server from allocating specified memory for SYN packets of different source addresses (including legitimate source addresses and illegitimate source addresses), and prevents the effective memory from being occupied, thereby preventing the memory from being consumed up and avoiding an increase in the machine load.

Optionally, when malfunction occurs in the receiving and sending of the TCP handshake connection, such TCP handshake connection may be carried out for multiple times. For example, the client 10 responds to the received SYN ACK packet for three times, and after replying the ACK packet to the anti-attack module of the LVS server at the third time, the anti-attack module of the LVS server may send the received ACK packet to the load-balancing module of the LVS server, thereby establishing connection. Because the LVS server does not forward the SYN packet directly to the back-end server 30, the back-end server 30 has not established connection with the client 10 yet.

For the client 10 to establish connection with the back-end server 30, preferably, the anti-attack module in the LVS server sends a control command (i.e., a CTRL packet) to the back-end server 30. After the back-end server 30 adds the back-end module, the business logic of the back-end server 30 has no change. The back-end server 30 is primarily responsible for communicating with the anti-attack module in the LVS server, and receiving and parsing the control command (CTRL packet) transferred from the anti-attack module. The anti-attack module of the LVS server sends the control command (CTRL packet) to the back-end module of the back-end server 30, and notifies the back-end server 30 about information related to the established connection. The information related to the established connection refers to the information related to the established connection between the client 10 and the LVS server, including key information such as the IP address and the port of the client 10. Simultaneously, the back-end module starts a connection waiting request. After receiving the CTRL packet, the back-end server further parses the CTRL packet and transfers the key information, such as the IP address and the port that is parsed to the client 10, to the back-end server kernel. The back-end server kernel officially establishes connection with the client 10 based on such information.

In the network load balance processing system in embodiments of the present disclosure, the client 10 is configured to send the SYN packet to the anti-attack module of the LVS server, and the anti-attack module of the LVS server is configured to acknowledge the received SYN packet and send the SYN ACK packet to the client 10. The client 10 is configured to respond to the received SYN ACK packet and send the ACK packet to the anti-attack module of the LVS server. The anti-attack module of the LVS server sends the control command (i.e., the CTRL packet) to the back-end server 30, and notifies the back-end module in the back-end server 30 to start a connection service directed to the client 10. The back-end module in the back-end server 30 parses the received CTRL packet, and further transmits the parsed information to the back-end server kernel, thereby establishing connection between the client 10 and the back-end server 30. Accordingly, the issue of high memory consumption in the network load balance processing is solved, thereby achieving an effect of low memory consumption in the network load balance processing.

Embodiments of the present disclosure also provide a network load balance processing method. The network load balance processing method in embodiments of the present disclosure may be implemented via the network load balance processing system in embodiments of the present disclosure. It should be noted that, steps illustrated in the flow chart of the accompanying drawings may be executed in a computer system comprising a set of computer executable instructions. Further, though the logic order is illustrated in the flow chart, under certain circumstances, the illustrated or described steps may be executed in an order different from descriptions herein.

Figure 4:
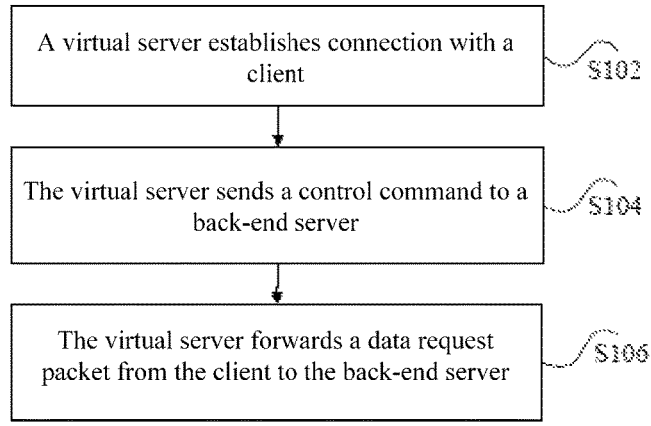
FIG. 4 illustrates a flow chart of a network load balance processing method according to a first embodiment of the present disclosure.

FIG. 4 illustrates a flow chart of a network load balance processing method according to a first embodiment of the present disclosure. As shown in FIG. 4, the network load balance processing method includes the following steps:

Step S102, a virtual server establishes connection with a client.

The disclosed virtual server is an LVS server. The client issues a TCP connection request to the LVS server to allow TCP handshake connection. Preferably, the virtual server establishes connection with the client via the following steps:

Step S1: the virtual server receives a handshake signal sent by the client.

The virtual server receives the handshake signal sent by the client. Further, the anti-attack module in the virtual server receives the handshake signal (i.e., a SYN packet) sent by the client, and responds to the connection request thereof. In particular, the client may be an ordinary internet user, or a special customer in a specialized field.

Step S2: the virtual server generates an acknowledgement signal of the handshake signal directly based on the handshake signal.

After receiving the handshake signal (i.e., SYN packet) sent by the client, the virtual server analyzes the received SYN packet and makes a decision whether or not the TCP connection request is approved. If the virtual server approves the TCP connection request sent by the client, the SYN ACK packet is generated and prepared to be sent to the client to notify the client that the TCP connection may be performed. If the TCP connection request from the client is not approved, no processing is executed.

Step S3: the virtual server sends the acknowledgement signal to the client.

If the result of analysis on the SYN packet received by the virtual server that is sent by the client is to approve the TCP connection request, the virtual server sends the acknowledgement signal to the client. Further, the anti-attack module in the virtual server directly generates the SYN ACK packet based on the handshake signal (SYN packet), sends the SYN ACK packet to the client, and waits for the corresponding response.

Step S4: the virtual server receives the response signal from the client, and establishes connection with the client.

After the client receives the acknowledgement signal (SYN ACK packet) sent by the anti-attack module in the virtual server, TCP connection is specified to be performed, and thus the response signal (ACK packet) is sent to the virtual server. After receiving the response signal (ACK packet) from the client, the virtual server specifies that the client may perform TCP connection.

Preferably, the anti-attack module of the virtual server carries a SYN cookies function and is primarily responsible for acknowledging the SYN packet sent by the client, replying the SYN ACK packet to the client instead of sending the SYN ACK packet directly to the back-end server, and receiving the replied ACK packet after the client responds to the SYN ACK packet. Such anti-attack module that carries the SYN Cookies function, under situations of a large volume of attack traffic, prevents the virtual server from allocating specified memory for the SYN packets of different source addresses (including legitimate source addresses and illegitimate source addresses), and prevents the effective memory from being occupied, thereby preventing the memory from being consumed up and avoiding an increase in the machine load. Because the virtual server does not directly forward the SYN packet to the back-end server, the back-end server has not established connection with the client yet.

Step S104, the virtual server sends a control command to the back-end server.

After the anti-attack module in the virtual server receives the response signal (ACK packet) sent by the client, the anti-attack module sends the ACK packet to the load-balancing module of the virtual server to establish TCP connection. For the client to establish connection with the back-end server, preferably, the virtual server possesses a function that sends the control command to the back-end server. The anti-attack module of the virtual server sends the control command to the back-end server and sends the information related to the established connection to the back-end server. By performing communication with the back-end module of the back-end server, the virtual server allows the back-end server to start a connection service based on the control command directed to connection. In particular, the sent control command includes key information such as the IP address and the port of the client.

Further, the virtual server sends the control command (CTRL packet) to the back-end module of the back-end server. In particular, under the condition that the business logic of the back-end server has no changes, the back-end module of the back-end server receives and parses the CTRL packet sent by the virtual server, and transmits the parsed key information such as the IP address and the port of the client to the back-end server kernel. The back-end server kernel officially establishes connection with the client based on such information.

Preferably, after the virtual server establishes connection with the client, to allow the established connection to be effective at any time and be convenient to be retrieved, the virtual server allocates memory for the connection. The memory is configured to store the connection record of established connection to ensure the safety of the connection record. Further, after the current connection is established, the virtual server retrieves the connection records from the memory and sends the connection record to the back-end server.

Step S106, the virtual server forwards the data request packet from the client to the back-end server.

After the client sends the TCP connection request and the client establishes connection with the back-end server, the client sends the data request packet to the virtual server, and the virtual server further forwards the data request packet from the client to the back-end server. In particular, the back-end server is configured to respond to the data request packet based on the connection service and send response information to the client.

The disclosed network load balance processing method uses the virtual server to establish connection with the client. The virtual server sends the control command to the back-end server and sends the information related to connection to the back-end server, such that the back-end server starts a connection service based on the control command directed to connection.

The virtual server forwards the data request packet from the client to the back-end server. In particular, the back-end server is configured to respond to the data request packet based on the connection service to solve the issue of high memory consumption in the network load balance processing, thereby achieving an effect of low memory consumption in the network load balance processing.

Figure 5:
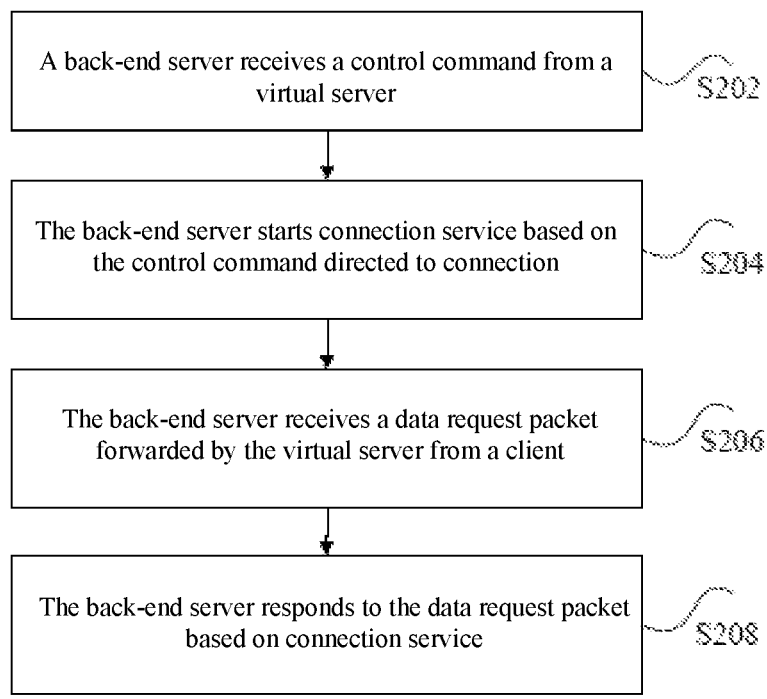
FIG. 5 illustrates a flow chart of a network load balance processing method according to a second embodiment of the present disclosure.

FIG. 5 illustrates a flow chart of a network load balance processing method according to a second embodiment of the present disclosure. As shown in FIG. 5, the network load balance processing method includes the following steps:

Step S202, the back-end server receives a control command from the virtual server.

The back-end server includes a back-end module, and the business logic of the back-end server has no changes. Such back-end module is primarily responsible for communicating with the anti-attack module in the virtual server, and receiving and parsing the control command forwarded by the anti-attack module. In particular, the virtual server is configured to, after establishing connection with the client, send the control command to the back-end server and send the information related to connection to the back-end server.

Further, the control command may be a CTRL packet. The back-end module receives the control command (CTRL packet) sent by the anti-attack module of the virtual server, and acquires information related to established connection. The information related to established connection refers to information related to the established connection between the client and the virtual server, including key information such as the IP address and the port of the client. Simultaneously, the back-end server starts the connection waiting request.

Step S204, the back-end server starts a connection service based on the control command directed to connection.

Preferably, the connection service started by the back-end server based on the control command directed to connection includes: the back-end server parses out the address information of the client and the port information of the client from the control command; and the back-end server starts the connection service for the client based on the address information of the client and the port information of the client. More specifically, the back-end server parses the received CTRL packet, and transmits the key information such as the IP address and the port of the client to the back-end server kernel. The back-end service kernel starts the connection service with the client based on such information, and semi-connection is officially established.

Step S206, the back-end server receives the data request packet forwarded by the virtual server from the client.

After the back-end server starts the connection service based on the control command directed to connection, the back-end server receives the data request packet forwarded by the virtual server from the client.

Step S208, the back-end server responds to the data request packet based on the connection service and sends response information to the client.

After the back-end server receives the data request packet forwarded by the virtual server from the client, because the connection service is started, the back-end server may respond directly to the data request packet.

The disclosed network load balance processing method uses the back-end server to receive the control command from the virtual server. In particular, the virtual server is configured to, after establishing connection with the client, send the control command to the back-end server and send the information related to connection to the back-end server. The back-end server starts a connection service based on the control command directed to connection. The back-end server receives the data request packet forwarded by the virtual server from the client. The back-end server responds to the data request packet based on the connection service. Accordingly, the issue of high memory consumption in the network load balance processing is solved, thereby achieving an effect of low memory consumption in the network load balance processing.

Figure 6:
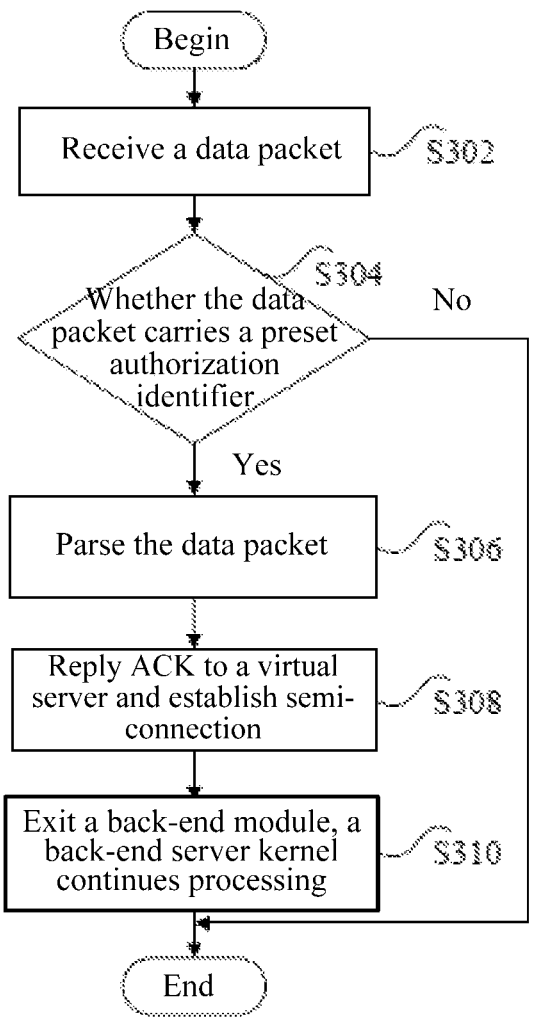
FIG. 6 illustrates a flow chart of a network load balance processing method according to a third embodiment of the present disclosure.

FIG. 6 illustrates a flow chart of a network load balance processing method according to a third embodiment of the present disclosure. As shown in FIG. 6, the network load balance processing method includes the following steps:

Step S302, receiving a data packet.

The control command is sent in a format of data packet. Preferably, after the back-end server receives the data packet, first, whether the received data packet is the data packet sent by the virtual server is determined. More specifically, the data packet is the control command (CTRL packet) sent by the anti-attack module of the virtual server to the back-end module of the back-end server.

Step S304, determining whether the data packet carries an authorization identifier.

To determine whether the received data packet is the data packet sent by the virtual server, the back-end server carries out determination via the following manners:

determining whether the received data packet carries the preset authorization identifier; if the data packet is determined to be the data packet carries the preset authorization identifier, the data packet passes authorization, the back-end server determines that the data packet is the data packet forwarded by the virtual server, Step S306 is executed, and the back-end server executes parsing of the data packet to parse out the control command from the data packet; if the back-end server determines that the data packet is the data packet that carries no preset authorization identifier, the data packets passes no authorization, the back-end server determines that the data packet is not the data packet forwarded by the virtual server, and the back-end server executes no processing on the data packet.

Step S306, parsing the data packet.

After the back-end server determines that the data packet is the data packet forwarded by the virtual server, the back-end server executes parsing of the data packet and parses out the control command from the data packet. The information included in the control command comprises key information such as the IP address and the port of the client.

Step S308, replying the acknowledgement signal to the virtual server and establishing semi-connection.

After the back-end server executes parsing on the data packet, the back-end server replies the acknowledgement signal to the virtual server and establishes semi-connection.

Step S310, exiting the back-end module, and continuing processing by the back-end server kernel.

When the semi-connection is established, the back-end module is exited. When the virtual server forwards the data request packet, the kernel performs response to the data request packet based on the recorded control command information.

The disclosed network load balance processing method receives the data packet and determines whether the data packet carries the authorization identifier. If the back-end server determines that the data packet is the data packet carries the preset authorization identifier, the data packet passes authorization, the back-end server determines that the data packet is the data packet forwarded by the virtual server, and the back-end server executes parsing on the data packet, thereby realizing the establishment of connection between the virtual server and the back-end server. Accordingly, the issue of high memory consumption of the network load balance processing is solved, thereby achieving an effect of low memory consumption in the network load balance processing.

Figure 7:
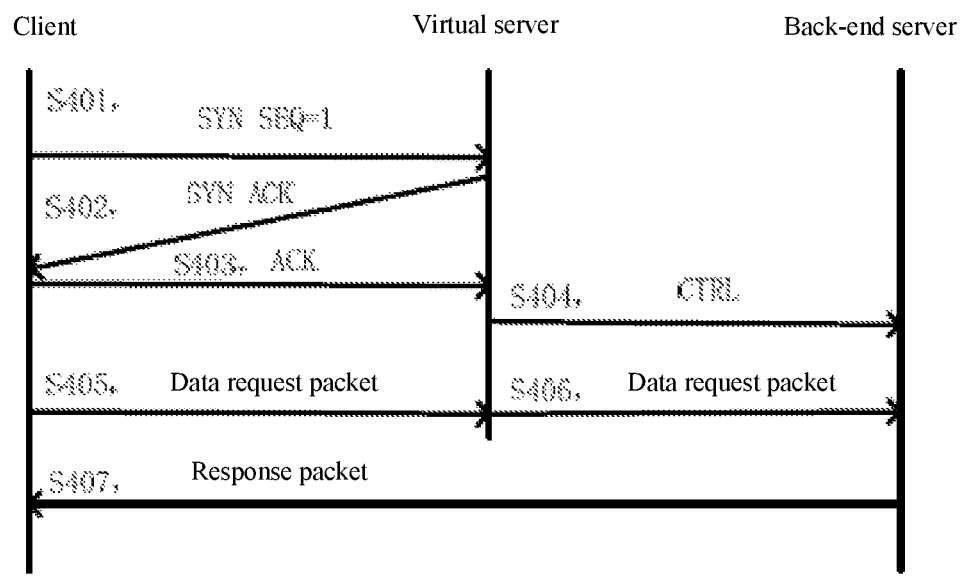
FIG. 7 illustrates a flow chart of a network load balance processing method according to a fourth embodiment of the present disclosure.

FIG. 7 illustrates a flow chart of a network load balance processing method according to a fourth embodiment of the present disclosure. As shown in FIG. 7, the network load balance processing method includes the following steps:

Step S401, the client sends a handshake signal to the virtual server.

Optionally, when the Linux external preset command SEQ is equal to 1, the client sends the handshake signal to the virtual server. Further, the anti-attack module in the virtual server receives the handshake signal (i.e., SYN packet) sent by the client, and performs response to the connection request thereof In particular, the client may be an ordinary internet user, or a special customer in a specialized field.

Step S402, the virtual server sends an acknowledgement signal to the client.

After receiving the handshake signal (SYN packet) sent by the client, the virtual server analyzes the handshake signal and makes a decision whether or not to approve the TCP connection request. If the TCP connection request is approved, an acknowledgement signal (SYN ACK packet) is generated and prepared to be sent to the client to notify the client that TCP connection may be performed. If the TCP connection request of the client is not approved, no processing is executed.

After the virtual server receives the handshake signal (SYN packet) sent by the client, if the result of analysis on the SYN packet is to approve the TCP connection request, the virtual server sends the acknowledgement signal to the client. Further, the anti-attack module in the virtual server directly generates the acknowledgement signal (the SYN ACK packet) based on the handshake signal (SYN packet), sends the SYN ACK packet to the client, and waits for a corresponding response.

Step S403, the client sends a response signal to the virtual server.

After receiving the acknowledgement signal (SYN ACK packet) sent by the anti-attack module in the virtual server, the client specifies that the TCP connection may be performed. Thus, the response signal (ACK packet) is sent to the virtual server. After receiving the response signal (ACK packet) from the client, the virtual server specifies that the client may perform TCP connection.

Preferably, the anti-attack module of the virtual server carries a SYN cookies function and is primarily responsible for acknowledging the SYN packet sent by the client and replying the SYN ACK packet to the client instead of sending the SYN ACK packet directly to the back-end server, and receiving the replied ACK packet after the client responds to the SYN ACK packet. Such anti-attack module that carries the SYN Cookies, under situations of a large volume of attack traffic, prevents the virtual server from allocating specified memory for the SYN packets of different source addresses (including legitimate source addresses and illegitimate source addresses), and prevents the effective memory from being occupied, thereby preventing the memory from being consumed up and avoiding an increase in the machine load.

Step S404, the virtual server sends the control command to the back-end server.

After the anti-attack module in the virtual server receives the response signal (i.e., ACK packet) sent by the client, the anti-attack module sends the ACK packet to the load-balancing module of the virtual server to establish the TCP connection. Further, the virtual server sends the control command (CTRL packet) to the back-end module of the back-end server. In particular, under the situation where the business logic of the back-end server has no changes, the back-end module of the back-end server receives and parses the CTRL packet sent by the virtual server, and transmits the key information such as the IP address and the port of the client to the back-end server kernel. The back-end server kernel officially establishes connection with the client based on such information.

Step S405, the client sends the data request packet to the virtual server.

Step S406, the virtual server forwards the data request packet sent by the virtual server from the client to the back-end server.

Step S407, the back-end server performs response to the data request packet.

Because the back-end server establishes connection with the client, the back-end server may directly respond to the data request packet without passing through the virtual server.

The disclosed network load balance processing method uses the client to send the handshake signal to the virtual server. The virtual server sends the acknowledgement signal to the client based on the received handshake signal, the client sends the response signal to the virtual server after receiving the acknowledgement signal, and the virtual server sends the control command to the back-end server after receiving the response signal. After the client establishes connection with the back-end server, the client sends the data request packet to the virtual server, and the virtual server forwards the data request packet sent by the client to the virtual server to the back-end server. The back-end server responds directly to the data request packet. Accordingly, the issue of high memory consumption in the network load balance processing is solved, thereby achieving an effect of low memory consumption in the network load balance processing.

Embodiments of the present disclosure further provide a network load balance processing device. It should be noted that, the network load balance processing device in embodiments of the present disclosure may be configured to execute the network load balance processing method in embodiments of the present disclosure.

Figure 8:
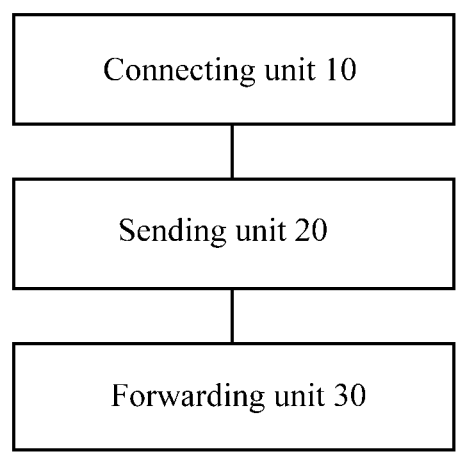
FIG. 8 illustrates a schematic view of a network load balance processing device according to a first embodiment of the present disclosure.

FIG. 8 illustrates a schematic view of a network load balance processing device according to a first embodiment of the present disclosure. As shown in FIG. 8, the network load balance processing device includes a connecting unit 10, a sending unit 20, and a forwarding unit 30.

The connecting unit 10 is configured to establish connection between the virtual server and the client. Preferably, the disclosed virtual server is an LVS server. The client issues a TCP connection request to the LVS server and performs TCP handshake connection.

The sending unit 20 is configured to send the control command to the back-end server and send the information related to connection to the back-end server, such that the back-end server starts a connection service based on the control command directed to connection. After the anti-attack module in the virtual server receives the response signal (ACK packet) sent by the client, the anti-attack module sends the ACK packet to the load-balancing module of the virtual server to establish the TCP connection. Preferably, the virtual server possesses a function of sending the control command to the back-end server. The virtual server sends the control command to the back-end server and sends the information related to established connection to the back-end server. Through communication with the back-end module of the back-end server, the virtual server allows the back-end server to start the connection service based on the control command directed to connection. In particular, the sent control command includes key information such as the IP address and the port of the client.

Further, the virtual server sends the control command (i.e., CTRL packet) to the back-end module of the back-end server. In particular, the business logic of the back-end server has no changes. The back-end module of the back-end server receives and parses the control command (CTRL packet) sent by the virtual server, and transmits the key information such as the IP address and the port of the client to the back-end server kernel. The back-end server kernel officially establishes connection with the client based on such information.

The forwarding unit 30 is used by the virtual server to forward the data request packet from the client to the back-end server. In particular, the back-end server is configured to respond to the data request packet based on the connection service and send the response information to the client. After the client sends the TCP connection request and the back-end server establishes connection with the client, the client sends the data request packet to the virtual server, and the virtual server further forwards the data request packet from the client to the back-end server.

Figure 9:
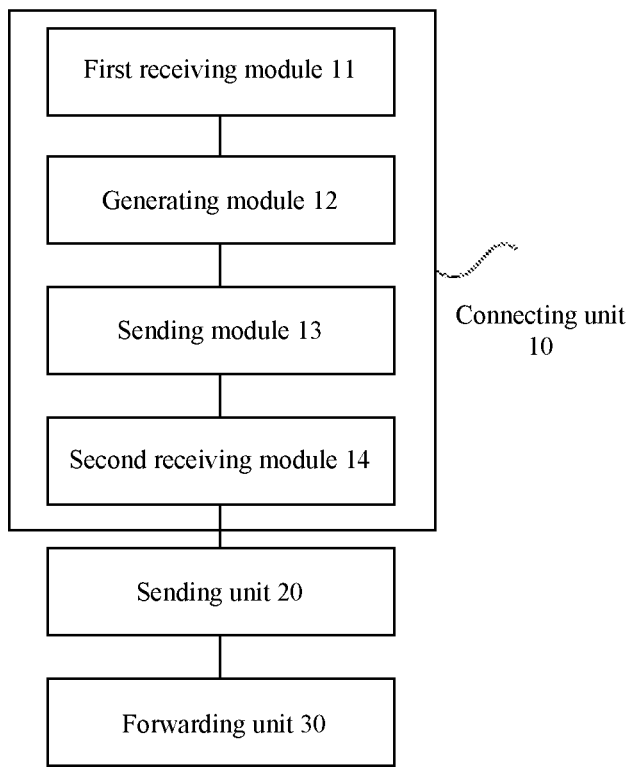
FIG. 9 illustrates a schematic view of a network load balance processing device according to a second embodiment of the present disclosure.

FIG. 9 illustrates a schematic view of a network load balance processing device according to a second embodiment of the present disclosure. As shown in FIG. 9, the network load balance processing device includes a connecting unit 10, a sending unit 20, and a forwarding unit 30. In particular, the connecting unit 10 includes a first receiving module 11, a generating module 12, a sending module 13, and a second receiving module 14.

The first receiving module 11 is configured to be used by the virtual server to receive the handshake signal sent by the client. Further, the anti-attack module in the virtual server receives the handshake signal (i.e., SYN packet) sent by the client, and responds to the connection request thereof.

The generating module 12 is used by the virtual server to directly construct the acknowledgement signal of the handshake signal based on the handshake signal. After the virtual server receives the handshake signal (i.e., a SYN packet) sent by the client, the SYN packet is analyzed, and a decision whether or not to approve the TCP connection request is made. If the TCP connection request is approved, an acknowledgement signal (i.e., a SYN ACK packet) is generated and prepared to be sent to the client, thereby notifying the client that the TCP connection may be performed. If the TCP connection request of the client is not approved, no processing is executed.

The sending module 13 is used by the virtual server to send the acknowledgement signal to the client. If the virtual server receives the handshake signal (SYN packet) sent by the client and the result of analysis on the SYN packet is to approve the TCP connection request, the virtual server sends the acknowledgment signal to the client. Further, the anti-attack module in the virtual server directly generates the acknowledgement signal (SYN ACK packet) based on the handshake signal (SYN packet), sends the SYN ACK packet to the client, and waits for a corresponding response.

The second receiving module 14 is used by the virtual server to receive the acknowledgement signal from the client, and establishes connection with the client. After the client receives the acknowledgement signal (SYN ACK packet) sent by the anti-attack module in the virtual server, the TCP connection may be specified to be performed. Thus, after the response signal (ACK packet) is sent to the virtual server and the virtual server receives the acknowledgement signal (ACK packet) from the client, the client is determined to be allowed for TCP connection.

Figure 10:
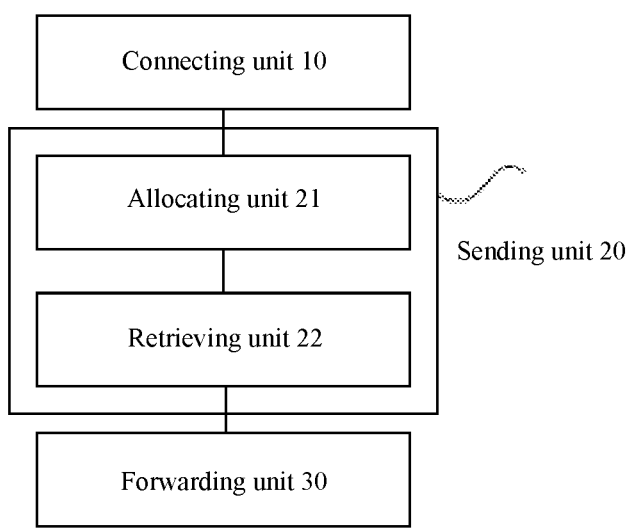
FIG. 10 illustrates a schematic view of a network load balance processing device according to a third embodiment of the present disclosure.

FIG. 10 illustrates a schematic view of a network load balance processing device according to a third embodiment of the present disclosure. As shown in FIG. 10, the device includes a connecting unit 10, a sending unit 20, and a forwarding unit 30. In particular, the sending unit 20 includes an allocating unit 21, and a retrieving unit 22.

The allocating unit 21 is configured to, after the virtual server establishes connection with the client, allocate memory for the connection, and the memory is configured to store the connection record of the connection.

The retrieving unit 22 is configured to retrieve the connection record from the memory, and send the connection record to the back-end server.

After the client establishes connection with the virtual server, to ensure the established connection is effective at any time and for ease of retrieving, the virtual server allocates memory for connection. The memory is configured to store the connection record of connection, thereby ensuring the safety of the connection record. Further, the virtual server may, after the current connection, retrieve the connection record from the memory and send the connection record to the back-end server.

Figures 11, 12:
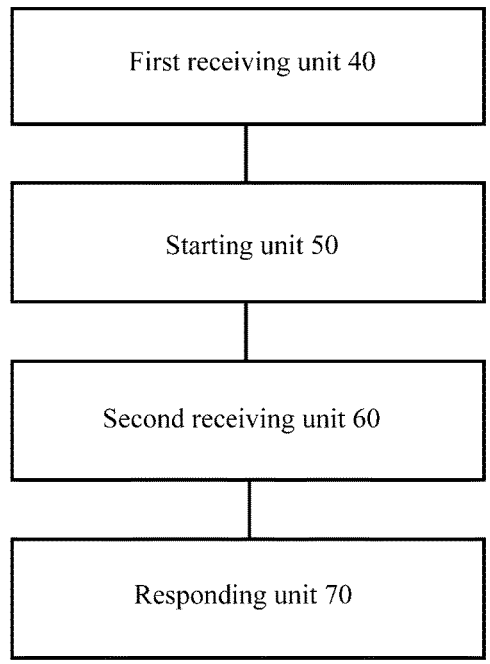
FIG. 11 illustrates a schematic view of a network load balance processing device according to a fourth embodiment of the present disclosure.
FIG. 12 illustrates a schematic view of a situation of attack traffic according to embodiments of the present disclosure.

FIG. 11 illustrates a schematic view of a network load balance processing device according to a fourth embodiment of the present disclosure. As shown in FIG. 11, the device includes a first receiving unit 40, a starting unit 50, a second receiving unit 60, and a responding unit 70.

The first receiving unit 40 is configured for the back-end server to receive the control command from the virtual server, where the virtual server is configured to, after establishing connection with the client, send the control command to the back-end server, and send the information related to connection to the back-end server. The back-end server includes a back-end module, and the business logic of the back-end server has no change. Such back-end module is primarily responsible for communicating with the anti-attack module in the visual service, and receiving and parsing the control command transferred from the anti-attack module.

Further, the control command may be a CTRL packet. The anti-attack module of the virtual server sends the control command (i.e., CTRL packet) to the back-end module of the back-end server, and notifies the back-end server about the information related to established connection. The information related to established connection refers to the information related to the established connection between the client and the virtual server, including the key information such as the IP address and the port of the client. Simultaneously, the back-end module starts the connection waiting request.

The starting unit 50 is configured for the back-end server to start the connection service based on the control command directed to connection. Preferably, the connection service started by the back-end server based on the control command directed to connection includes: the back-end server parses the address information of the client and the port information of the client from the control command; and the back-end server starts a connection service for the client based on the address information of the client and the port information of the client. More specifically, the back-end server parses the received CTRL packet, and transmits the key information such as the IP address and the port of the client to the back-end server kernel. The back-end service kernel starts connection service with the client based on such information, and the semi-connection is officially established.

The second receiving unit 60 is configured for the back-end server to receive the data request packet forwarded by the virtual server from the client. After the back-end server starts the connection service based on the control command directed to connection, the back-end server receives the data request packet forwarded by the virtual server from the client.

The responding unit 70 is configured for the back-end server to respond to the data request packet based on the connection service. After the back-end server receives the data request packet forwards by the virtual server from the client, because the back-end server starts the connection service, the back-end server may directly respond to the data request packet.

The disclosed network load balance processing device may use a network load balance processing method, and the virtual server may establish connection with the client via the connecting unit 10. Via the sending unit 20, the control command is sent to the back-end server and the information related to connection is sent to the back-end server, such that the back-end server starts a connection service based on the control command directed to connection. Via the forwarding unit 30, the data request packet from the client is forwarded to the back-end server. In particular, the back-end server is configured to respond to the data request packet based on the connection service, and for the back-end server, via the first receiving unit 40, the control command from the virtual server is received. In particular, the virtual server is configured to after connection with the client is established, send the control command to the back-end server and send the information related to connection to the back-end server. Via the starting unit 50, the connection service is started based on the control command directed to connection. Via the second receiving unit 60, the data request packet forwarded by the virtual server from the client is received. Via the responding unit 70, the data request packet is responded to based on the connection service. Accordingly, the issue of high memory consumption in the network load balance processing is solved, thereby achieving an effect of low memory consumption in the network load balance processing.

FIG. 12 illustrates a schematic view of a situation of attack traffic according to embodiments of the present disclosure. After the client establishes connection with the back-end server according to the present disclosure, the data request packet is transmitted. As shown in FIG. 12, the request number of receiving data per second (RX) may be 9829633 pps/s, 10264612 pps/s, 10411770 pps/s, 10335642 pps/s, 10327597 pps/s, 10127690 pps/s, and 10182987 pps/s, etc. The virtual server may resist the attack as high as 104000000 pps/s. Under attack of the aforementioned strength, the back-end server may still operate normally, and the ten-gigabit network card reaches the peak value. By then, a few packet loss occurs in the network card, and the limit of the network card is reached. As shown in FIG. 12, the packet loss of the receiving data (RX_drop) may be 5.401%, 2.810%, 5.659%, 3.185%, 1.308%, 3.940%, 2.582%, etc. The loss degree of the receiving data is relatively low.

FIG. 13 illustrates a schematic view of a situation of memory occupancy rate according to embodiments of the present disclosure. Under the situation of attack traffic illustrated in the embodiment illustrated in FIG. 12, as shown in FIG. 13, the memory occupancy ratio of the virtual server (% soft) may be 15.38%, 79.17%, 78.26%, 80.22%, 67.74%, 46.15%, 33.33%, 71.58%, 65.08%, 43.48%, 36.67%, 33.33%, and 32.26%, etc, and the memory consumption is low. As such, the present disclosure solves the issue of high memory consumption in the network load balance processing, thereby achieving the effect of low memory consumption in the network load balance processing.

The primary object of the present disclosure is to improve the anti-attack performance of the virtual server of the server, and simultaneously ensures that the virtual server performs high-effective and low consumptive load balance processing. Directed to the deficiencies in existing technology, the present disclosure uses the DR mode to perform scheduling, thereby ensuring that the visual sever load balance operates highly effectively and low consumptively. Based on the DR mode, a SYN cookies function is added, and via the three handshake processes of the TCP act on behalf by the virtual server, the ability of the server in resisting the SYN Flood attack is enhanced. After the establishment method of the connection between the virtual server and the back-end server is improved, the virtual server and the back-end server no longer need three complete TCP handshakes, but the connection may be established simply via one control command. Accordingly, extra consumption caused by the connection established between the virtual server and the back-end server under the high concurrent business is dramatically reduced. The back-end server directly acknowledges the data to the client without passing through the virtual server, thereby greatly enhancing the service ability of the clustering system. Further, the extensibility of the system is strong, such that a relatively large number of back-end servers may be driven. Accordingly, the issue of high memory consumption in the network load balance processing is solved, thereby achieving an effect of high memory consumption in the network load balance processing.

Obviously, those skilled in the relevant art should understand that the each aforementioned module or step of the present disclosure may be implemented using a universal computing device, and the modules or steps may be concentrated on a single computing device or distributed on a network comprising a plurality of computing devices, and may optionally be implemented by programmable codes executable for the computational device, such that the modules or steps may be stored in a storage device for execution by the computing device. Or, the modules or steps may be fabricated into each integrated circuit module, respectively, or a plurality of modules or steps thereof may be fabricated into a single integrated circuit module for implementation. Accordingly, the present disclosure is not limited to any specific combination of hardware and software.

The aforementioned are only preferred embodiments of the present disclosure, and is not intended to be limiting of the present disclosure. For those skilled in the relevant art, the present disclosure may have various modifications and variations. Any modification, equivalent alteration, and improvement, etc., without departing from the spirit and principle of the present disclosure, shall fall within the protection scope of the present disclosure.

What is claimed is:

1. A network load balance processing method, comprising:
    establishing, by a virtual server, a connection with a client using a synchronous (SYN) cookies function performed by an anti-attack module of the virtual server;
    sending, by the virtual server, a control command to a back-end server and information related to the connection to the back-end server, such that the back-end server starts a connection service based on the control command and directed to the connection between the virtual server and the client; and
    forwarding, by the virtual server, a data request packet from the client to the back-end server, wherein the back-end server is configured to respond to the data request packet based on the connection service by determining whether the data packet is a data packet forwarded by the virtual server and send response information to the client, wherein:
        when the back-end server determines that the data packet is not the data packet forwarded by the virtual server, no processing is executed on the data packet, and
        when the back-end server determines that the data packet is the data packet forwarded by the virtual server, the data packet is parsed by the back-end server, such that the control command is parsed out from the data packet.

2. The method according to claim 1, wherein using the SYN cookies function performed by the anti-attack module of the virtual server includes:
    receiving a handshake signal sent by the client for a connection request, the handshake signal including a synchronous (SYN) packet;
    responding to the handshake signal for the connection request from the client;
    generating an acknowledgement signal based on the handshake signal, the acknowledgement signal including a SYN acknowledgement (ACK) packet;
    sending the acknowledgement signal to the client; and
    receiving a response signal from the client and establishing the connection with the client, the response signal including an ACK packet from the client.

3. The method according to claim 2, wherein generating the acknowledgement signal includes:
    after receiving the handshake signal sent from the client, analyzing, by the virtual server, the handshake signal and determining an approval of the connection request, and
    after approving the connection request, generating, by the virtual server, the acknowledgement signal.

4. The method according to claim 2, further including sending the acknowledgement signal to the client without sending to the back-end server.

5. The method according to claim 2, wherein:
    the virtual server is configured to respond to the handshake signal from the client without forwarding the handshake signal to the back-end server, and
    a connection between the client and the back-end server is unestablished, while the virtual server receiving a response signal from the client and establishing the connection with the client.

6. The method according to claim 2, further including:
    sending, by the virtual server, a control command to the back-end server;
    forwarding, by the virtual server, data request packet from the client to the back-end server.

7. A network load balance processing method, comprising:
    receiving, by a back-end server, a control command from a virtual server, wherein the virtual server is configured to send the control command in a form of data packet to the back-end server after establishing a connection with a client and send information related to the connection between the virtual server and the client to the back-end server;
    determining, by the back-end server, whether the data packet is a data packet forwarded by the virtual server, wherein:
        when the back-end server determines that the data packet is not the data packet forwarded by the virtual server, no processing is executed on the data packet, and
        when the back-end server determines that the data packet is the data packet forwarded by the virtual server, the data packet is parsed by the back-end server, such that the control command is parsed out from the data packet;
    starting, by the back-end server, a connection service based on the control command and directed to the connection between the virtual server and the client;
    receiving, by the back-end server, a data request packet forwarded by the virtual server from the client; and
    responding, by the back-end server, to the data request packet based on the connection service, and sending, by the back-end server, response information to the client.

8. The network load balance processing method according to claim 7, wherein the back-end server determines whether the data packet is forwarded by the virtual server via a following method:
   determining, by the back-end server, whether the data packet is a data packet carries a preset authorization identifier;
   when the back-end server determines that the data packet is the data packet carries the preset authorization identifier, the back-end server confirms that the data packet is the data packet forwarded by the virtual server; and
   when the back-end server determines that the data packet is a data packet carries no preset authorization identifier, the back-end server confirms that the data packet is not the data packet forwarded by the virtual server.

9. The network load balance processing method according to claim 7, wherein starting, by the back-end server, the connection service based on the control command and directed to the connection between the virtual server and the client includes:
   parsing out, by the back-end server, address information of the client and port information of the client from the control command; and
   starting, by the back-end server, the connection service for the client based on the address information of the client and the port information of the client.

10. A network load balance processing device, comprising:
   a back-end server, configured to:
   receive a control command from a virtual server, wherein the virtual server is configured to, after connection with a client is established, send the control command in a form of data packet to the back-end server and send information related to connection to the back-end server;
   determine whether the data packet is a data packet forwarded by the virtual server, wherein:
      when the back-end server determines that the data packet is not the data packet forwarded by the virtual server, no processing is executed on the data packet, and
      when the back-end server determines that the data packet is the data packet forwarded by the virtual server, the data packet is parsed by the back-end server, such that the control command is parsed out from the data packet;
   start a connection service based on the control command and directed to the connection between the virtual server and the client;
   receive a data request packet forwarded by the virtual server from the client; and
   respond to the data request packet based on the connection service and send response information to the client.

11. The network load balance processing device according to claim 10, wherein the back-end server is further configured to determine whether the data packet is the data packet forwarded by the virtual server by determining whether the data packet is the data packet carries a preset authorization identifier,
   when the back-end server determines that the data packet is the data packet carries the preset authorization identifier, the back-end server determines that the data packet is the data packet forwarded by the virtual server, and
   when the back-end server determines that the data packet is the data packet carries no preset authorization identifier, the back-end server determines that the data packet is not the data packet forwarded by the virtual server.

12. The network load balance processing method according to claim 10, wherein the back-end server is further configured to:
   parse out address information of the client and port information of the client from the control command; and
   start the connection service for the client based on the address information of the client and the port information of the client.

* * * * *